(12) United States Patent
Bayer et al.

(10) Patent No.: US 8,506,792 B2
(45) Date of Patent: Aug. 13, 2013

(54) METHOD FOR MACHINING A METAL COMPONENT

(75) Inventors: Erwin Bayer, Dachau (DE); Martin Bussmann, Schwabhausen (DE); Albin Platz, Ried-Baindlkirch (DE)

(73) Assignee: MTU Aero Engines GmbH, Munich (DE)

( * ) Notice: Subject to any disclaimer, the term of this patent is extended or adjusted under 35 U.S.C. 154(b) by 577 days.

(21) Appl. No.: 12/747,903

(22) PCT Filed: Dec. 5, 2008

(86) PCT No.: PCT/DE2008/002041
§ 371 (c)(1),
(2), (4) Date: Sep. 8, 2010

(87) PCT Pub. No.: WO2009/074142
PCT Pub. Date: Jun. 18, 2009

(65) Prior Publication Data
US 2011/0186442 A1    Aug. 4, 2011

(30) Foreign Application Priority Data
Dec. 13, 2007   (DE) .......................... 10 2007 060 071

(51) Int. Cl.
*B23H 9/10*    (2006.01)
*B23H 3/00*    (2006.01)

(52) U.S. Cl.
USPC ....... 205/651; 204/224 M; 205/645; 205/646; 205/649; 205/660

(58) Field of Classification Search
USPC ................... 204/224 M; 205/645, 646, 649, 205/651, 660
See application file for complete search history.

(56) References Cited

U.S. PATENT DOCUMENTS

| | | | |
|---|---|---|---|
| 7,204,926 B2 * | 4/2007 | Lamphere et al. | 205/652 |
| 7,462,273 B2 * | 12/2008 | Mielke | 205/651 |
| 8,034,228 B2 * | 10/2011 | Bayer et al. | 205/651 |
| 8,057,645 B2 * | 11/2011 | McGee et al. | 204/223 |

FOREIGN PATENT DOCUMENTS
EP    1707294 A2    10/2006
WO    2006/012852 A1    2/2006

OTHER PUBLICATIONS

PCT/DE2008/002041, International Search Report and Written Opinion, Jul. 27, 2010.

* cited by examiner

*Primary Examiner* — Nicholas A Smith
(74) *Attorney, Agent, or Firm* — Howison & Arnott, L.L.P.

(57) ABSTRACT

The invention concerns a method for the machining of a metallic structural component, particularly a structural component of a gas turbine, by means of finishing with a pulsed electrochemical ablation process, whereby the structural component features a pre-contour, to be finished, with different over-measures. The method is characterized by the following processing steps: a) determination of the different over-measures of the pre-contour, and b) bilateral and simultaneous finishing by means of a simultaneous feed of respectively at least one electrode disposed on different sides of the structural component, whereby the feed velocity of the electrode in the area of the largest over-measure of the pre-contour is higher than the feed velocity in the area of the smaller over-measure of the pre-contour.

20 Claims, No Drawings

METHOD FOR MACHINING A METAL COMPONENT

CROSS-REFERENCE TO RELATED APPLICATIONS

This application is a U.S. National Phase application submitted under 35 U.S.C. §371 of Patent Cooperation Treaty application serial no. PCT/DE2008/002041, filed 5 Dec. 2008, and entitled METHOD FOR MACHINING A METAL COMPONENT, which application claims priority to German patent application serial no. 10 2007 060 071.4, filed 13 Dec. 2007, and entitled VERFAHREN ZUR BEARBEITUNG EINES METALLISCHEN BAUTEILS.

Patent Cooperation Treaty application serial no. PCT/DE2008/002041, published as WO 2009/074142, and German patent application serial no. 10 2007 060 071.4, are incorporated herein by reference.

TECHNICAL FIELD

The present invention concerns a method for the machining of a metallic structural component, particularly a structural component of a gas turbine, by means of a finishing process with a pulsed electro-chemical ablation process, whereby the structural component features a pre-contour to be finished with different dimensions. The invention furthermore concerns applications of the method according to the invention.

BACKGROUND

Methods for the electro-chemical machining of a metallic structural component are known. The so-called electrochemical finishing for example represents a method for the exact and very precise machining of surfaces. During electrochemical finishing the surface of the work piece is usually machined with an electrode, whereby by means of electrochemical reaction of the work piece with the electrolyte that is located between the work piece and the electrode an ablation of material from the work piece is accomplished. In this case the electrode is connected to a direct current source as cathode. The electrode then moves toward the structural component that is biased as anode at a prescribed velocity. In the context of this so-called ECM (Electrochemical Machining) or PECM (Precise Electrochemical Machining)-method the width of the working space between the electrode and the structural component is of essential importance. During usual processes of the electrochemical finishing one works with spacings from the electrode to the work piece that are in the range of 0.1 to 1 mm. In order to generate finer structures and forms, the spacing can be lowered to dimensions on the order of 10 to 100 µm and lower. The successful application of a pulsed ECM-process (PECM) requires however in many application areas an even over-measure of the structural components to be machined. An electrochemically produced pre-contour of a blade of a gas turbine, particularly a Blisk (Blade Integrated Disks) blade, features for example a process-dependent over-measure between about 1 and about 3 mm. In order to achieve in these cases a necessary even over-measure the uneven over-measure has been machined up until now by means of milling. Such a method is however only useable to a very limited extent in the machining of very thin three-dimensional structural component profiles because the danger of damage, such as for example of a deformation of the structural components, exists in this case. In addition such a process step is relative effort-intensive and therefore costly.

SUMMARY

It is therefore the object of the present disclosure to provide a method for machining of a metallic structural component of the type discussed above, with which a simple, precise, work piece-preserving, and quick manufacture of an equidistant over-measure of a pre-contour or a corresponding manufacture of a final contour of the structural component is assured.

The objects of the disclosure are achieved by means of a method with the characteristics provided herein.

Advantageous embodiments are described herein.

DETAILED DESCRIPTION

A method according to one embodiment provides for machining of a metallic structural component, in particular a structural component of a gas turbine, by means of finishing with a pulsed electrochemical ablation process, whereby the structural component features a pre-contour with different over-measures to be finished, features the following processing steps: a) determination of the different over-measures of the pre-contour, and b) bilateral and simultaneous finishing by means of a simultaneous feed of respectively at least one electrode disposed on different sides of the structural component, whereby the feed velocity of the electrode in the area of the largest over-measure of the pre-contour is higher than the feed velocity in the area of the smaller over-measure of the pre-contour.

By means of the method according to the embodiment, it is possible to generate an even and equidistant over-measure of the pre-contour or an end-contour precisely, simply, and quickly. In addition the utilized electrochemical finishing method is work piece-preserving because the electrodes that are respectively disposed on different sides of the structural component are moved evenly toward one another. The method is thereby also very well suited for the machining of very thin three-dimensional structural component profiles. The determination of the different over-measures of the pre-contour can, for example, be accomplished through optical measurement means. Corresponding to the results and in particular the differences in the over-measures of the pre-contour, the feed velocity of each electrode is determined such that the electrodes can cover, in an equal time interval, the different path lengths to the predetermined pre-contour or to the final contour.

In another advantageous embodiment of the method, the structural component is a blade of a gas turbine, in particular the blade of an integrally bladed gas turbine rotor, whereby in process step b) a bilateral and simultaneous finishing of the vacuum side-contour and the pressure side-contour of the blade by means of the simultaneous feed of respectively at least one electrode disposed on the pressure side and the vacuum side of the blade profile is implemented. In addition again, the feed velocity of the electrode in the area of the larger over-measure of the pre-contour is larger than the feed velocity of the electrode in the area of the smaller over-measure of the pre-contour. Here also one obtains the advantage of bilateral synchronized finishing with even pressure, which precludes deformations of the blade during the machining In addition one obtains a secure process implementation despite different spacing widths between the respective electrode and the structural component or the blade. The described embodiment of the method permits a simple, precise, work piece-preserving and quick machining of an equidistant over-measure of a pre-contour or the corresponding machining of an end-contour of a blade. The tolerance of the equidistant over-measure of the pre-contour of the structural component or the blade can thereby be less than 0.5 mm after the implementation of the process step b).

In an additional advantageous embodiment of the method, two facing electrodes are utilized which are lowered down to the structural component to be machined, whereby the structural component is located between the electrodes. The elastic deformation of the structural component to be machined can thereby be reliably prevented. The facing electrodes can thereby be lowered down to the structural component to be machined at a pre-defined angle so that structural components with different geometry on upper and lower side can be machined simultaneously.

In yet another advantageous embodiment of the method, the electrodes are connected to a synchronized pulsed current source. In a particularly preferred arrangement all current pulses between the electrodes and the structural component are temporally synchronously sent and distinguish themselves only in the amplitude of the current. In addition it is advantageous if the electrolyte composition, the electrolyte pressure, the electrolyte temperature and/or the electric potential are respectively equal in the area of the electrodes. Etching attacks and short circuits at the structural component to be machined and the electrodes are thereby reliably prevented, despite the different feed velocities of the individual electrodes. In this context it was possible to determine that no collision or short circuit results despite feed differences in the range of a factor of 4. The implementation of the same electrolyte composition, the same electrolyte pressure, the same electrolyte temperature and/or the same electric potential in the area of the respective electrodes means in this context that the named parameters can deviate from one another by a small amount, the electrochemical behavior however must not be influenced, meaning it is the same.

In a further advantageous embodiment of the method, the pre-contour of the structural component to be finished is manufactured electrochemically. Thereby for example blades of an integrally bladed gas turbine rotor can be manufactured by means of electrochemical finishing. The raw blades manufactured thereby feature a process-contingent pre-contour, to be finished, with different over-measures. In a further procedure the manufacture of the predetermined, equidistant over-measures of the pre-contour or the manufacture of the final contour is implemented as is described in the process steps a) and b) of the method according to the invention.

In a further advantageous embodiment of the method, the contour of every electrode is adapted to the pre-contour to be finished or to the final contour of the structural component. It is thereby possible that the machining step of the bilateral and simultaneous finishing is implemented very quickly and precisely.

In a further advantageous embodiment of the method, the electrodes execute oscillatory movements during the lowering according to process step b). In particular in combination with the PECM process very high surface qualities can be achieved because the electrode gap can be completely flushed out with fresh, unused electrolyte between the pulse breaks. Possible gas bubbles and electrode sludge can be reliably removed from the electrode gap. In the case of oscillating electrodes a current pulse is released only in the range of the smallest spacing between the electrode and the structural component to be machined. In the range of the maximal spacing between electrode and the work piece to be machined the electrolyte flushing then takes place.

In a further advantageous embodiment of the method, the structural component is, after implementation of the processing step b) up to an equidistant over-measure of the pre-contour, supplied to further fine-machining by means of a pulsed or non-pulsed electrochemical ablation or finishing process for achieving an end-contour of the structural component. In the case of these end-contours, one can consider especially so-called streamlined aerodynamic surfaces that preferably again are realized by means of a PECM process. Streamlined aerodynamic surfaces can for example be the vacuum side and the pressure side of a blade of a gas turbine, particularly a blade of an integrally bladed gas turbine rotor as well as the ring areas that are positioned between the blades.

The method according to the invention is utilized—as previously described—in the manufacture of propulsion system components made from nickel, cobalt- or titanium base alloys, particularly the manufacture of blade profiles.

An additional use of the of the method according to the invention—as previously described—is in the manufacture of propulsion system structural components, particularly the manufacture of integral rotor constructions. This concerns particularly a rotor blade and a rotor disk consisting of one piece (BLISK) and blades that are integrally manufactured with a supporting ring (BLING).

The invention claimed is:

1. A method for machining a metallic structural component by finishing with a pulsed electrochemical ablation process, wherein before finishing the structural component has a pre-contour with different over-measures in different areas, the method including the following steps:
    a) determining the different over-measures of the pre-contour in the different areas; and
    b) bilaterally and simultaneously finishing the structural component by simultaneously feeding at least one electrode disposed on one side of the structural component in an area of a larger over-measure of the pre-contour and at least another electrode disposed on a different side of the structural component in an area of a smaller over-measure of the pre-contour, whereby the feed velocity of the electrode in the area of the larger over-measure of the pre-contour is larger than the feed velocity of the electrode in the area of the smaller over-measure of the pre-contour, until either a predetermined, equidistant over-measure of the pre-contour is achieved or until an end-contour of the structural component is achieved.

2. A method according to claim 1, wherein:
    the structural component is a blade of a gas turbine, in particular of an integrally bladed gas turbine rotor, the blade having a blade profile with a vacuum side and a pressure side; and
    during the step of bilaterally and simultaneously finishing, a bilateral and simultaneous finishing of the vacuum-side pre-contour and pressure-side pre-contour of the blade is implemented by simultaneous feeding of at least one electrode disposed on each of the pressure side and the vacuum side of the blade profile, whereby the feed velocity of the electrode in the area of the larger over-measure of the pre-contour is larger than the feed velocity of the electrode in the area of the smaller over-measure of the pre-contour.

3. A method according to claim 1, wherein two facing electrodes are lowered down to the structural component to be finished.

4. A method according to claim 1, wherein the electrodes are connected to a synchronized, pulsed current source.

5. A method according to claim 1, wherein the electrolyte composition, the electrolyte pressure, the electrolyte temperature and/or the electric potential are respectively substantially the same in the areas of the electrodes.

6. A method according to claim 1, wherein the pre-contour of the structural component to be finished is manufactured electrochemically.

7. A method according to claim 1, wherein the tolerance of the equidistant over-measure of the pre-contour of the structural component amounts to less than 0.5 mm after the implementation of the step of bilaterally and simultaneously finishing.

8. A method according to claim 1, wherein the contour of every electrode is adapted to the pre-contour to be finished or the end-contour of the structural component.

9. A method according to claim 1, wherein the electrodes during the lowering down execute oscillatory movements during the step of bilaterally and simultaneously finishing.

10. A method according to claim 1, wherein after implementation of the step of bilaterally and simultaneously finishing up to an equidistant over-measure of the pre-contour, the structural component is supplied to further fine-machining by means of a pulsed or non-pulsed electrochemical ablation or finishing process for achieving an end-contour of the structural component.

11. A method according to claim 1, wherein the structural components are made from at least one of nickel-, cobalt- or titanium-base alloys, particularly for the manufacture of blade profiles.

12. A method according to claim 1, wherein the structural component is an integral (one-piece) rotor construction having rotor blades integrally manufactured with a rotor disk (BLISK).

13. A method according to claim 1, wherein the structural component is an integral (one-piece) rotor construction having rotor blades integrally manufactured with a supporting ring (BLING).

14. A method for machining a metallic structural component having a pre-contour with different over-measures in different areas relative to a predetermined end-contour, the method including the following steps:
  a) determining the over-measures of the pre-contour relative to the predetermined end-contour in the different areas of the structural component;
  b) simultaneously feeding at least one electrode for pulsed electrochemical ablation toward one side of the structural component in an area of a larger over-measure of the pre-contour relative to the end-contour and feeding at least another electrode for pulsed electrochemical ablation toward a bilaterally opposing side of the structural component in an area of a smaller over-measure of the pre-contour relative to the end-contour, wherein the feed velocity of the electrode in the area of the larger over-measure of the pre-contour is larger than the feed velocity of the electrode in the area of the smaller over-measure of the pre-contour; and
  c) simultaneously finishing the bilaterally opposing sides of the structural component using pulsed electrochemical ablation.

15. A method according to claim 14, further comprising the following step:
  d) repeating steps b) and c) until one of the following conditions is met, namely
    (i) a predetermined, equidistant over-measure of the pre-contour is achieved; or
    (ii) an end-contour of the structural component is achieved.

16. A method according to claim 14, wherein each electrode is fed toward the respective side of the structural component at a pre-defined angle corresponding to a different geometry of each respective side such that the opposing sides can be machined simultaneously.

17. A method according to claim 14, wherein each electrode executes oscillatory movements toward and away from the side of the structural component during feeding.

18. A method according to claim 17, wherein a current pulse is released from the oscillating electrode only when the respective electrode is in the range of the smallest spacing between the electrode and the side of the structural component.

19. A method for machining a metallic structural component having a pre-contour with different over-measures in different areas relative to a predetermined end-contour, the method including the following steps:
  a) determining the over-measures of the pre-contour relative to the predetermined end-contour in the different areas of the structural component;
  b) simultaneously finishing the bilaterally opposing sides of the structural component using pulsed electrochemical ablation by simultaneously feeding at least one electrode toward one side of the structural component in an area of a larger over-measure of the pre-contour relative to the end-contour and feeding at least another electrode toward a bilaterally opposing side of the structural component in an area of a smaller over-measure of the pre-contour relative to the end-contour, wherein the feed velocity of the electrode in the area of the larger over-measure of the pre-contour is larger than the feed velocity of the electrode in the area of the smaller over-measure of the pre-contour; and
  c) oscillating each electrode, as the electrode is being fed toward the structural component, such that the electrode gap between the electrode and the structural component repeatedly ranges between a minimal spacing and a maximal spacing.

20. A method according to claim 19, wherein a current pulse is released from the electrode only when the respective electrode gap is in the range of the minimal spacing.

* * * * *